JOHN G. CASE.
Improvement in Cotton Gins.
No. 123,868. Patented Feb. 20, 1872.
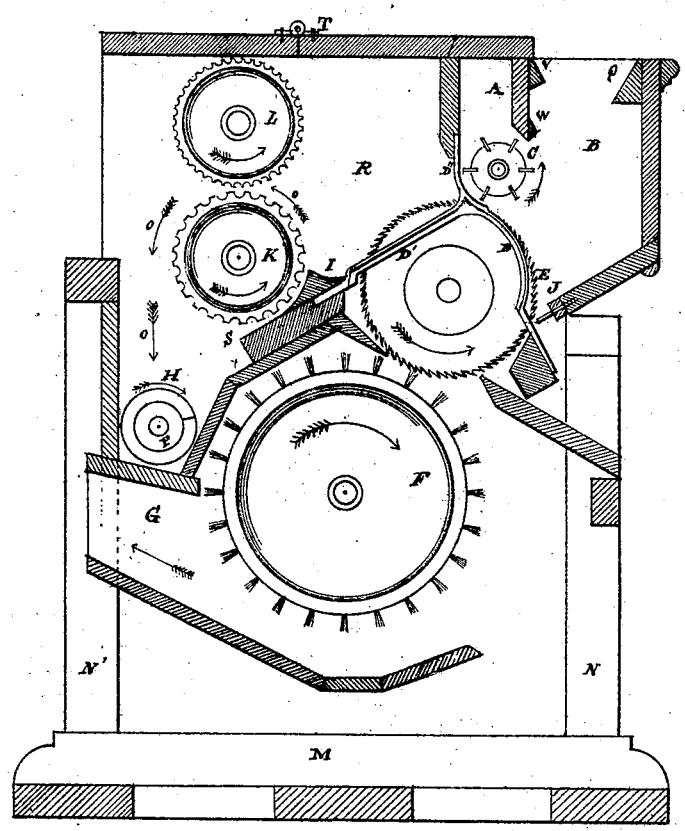

UNITED STATES PATENT OFFICE.

JOHN G. CASE, OF NEW LONDON, CONNECTICUT, ASSIGNOR TO HIMSELF AND CHARLES W. MATTHEWS, OF PHILADELPHIA, PENNSYLVANIA.

IMPROVEMENT IN COTTON-GINS.

Specification forming part of Letters Patent No. 123,868, dated February 20, 1872.

Be it known that I, JOHN G. CASE, of the city of New London, State of Connecticut, have invented certain Improvements in Cotton-Hulling and Ginning Machines, of which the following is a specification.

This invention relates to certain improvements in cotton-gins and consists of a curved piece secured to the bottom of the rib of the cotton-gin, in combination with a fluted discharge-roller for the purpose of preventing the accumulation and discharge of the seed under the discharge-roller.

The accompanying drawing, forming a part of this specification, is a vertical section taken entirely through the gin, showing fully the working parts and their reference to each other.

The cotton taken up by saws E, after being divested of hulls and trash, passes into the roll-box R, where it forms a ginning-roll. This roll is kept in motion by the combined action upon it of the saws and the revolving fluted roller K, until the seed is ginned from the cotton adhering to them. The seed are then discharged from the gin by being thrown over the roller K and between it and the roller L. Heretofore the seeds have been discharged through the space S under the roller K, but when discharged in this manner it was found to be very difficult to govern the discharge. The roller K, by reason of its revolving in the direction required to assist the revolution of the cotton-roll, was opposed to the discharge of the seed through S, and sometimes entirely prevented it.

The inventor has found that by inserting in the roll-box R at the bottom of the rib and near the roller K the curved piece I, so as to prevent the seed passing into the space S, the seed when fully cleaned will be taken up by the roller K and discharged over it.

This feature, besides obviating the trouble above named, gives also these advantages: the seed will not be taken from the cotton-roll by the roller K until they are fully cleaned; and by changing the speed of the roller K the seed can be held in the roll for a longer or shorter period until fully ginned, thus affording a means of regulating the discharge of the seed, which is a matter of great difficulty in most of the gins in use.

It will be seen that this mode of discharging the seed differs from others in this particular, that while in other gins the seeds are discharged by their weight or gravity, in this improvement they are discharged by the mechanical action of the roller K.

The lint-cotton, after being taken off, is thrown by a revolving brush in the ordinary manner through the flue G into the lint-room of the gin-house. The seed thrown over the roller K fall into the box H where a revolving drum conveys them out of the machine.

I claim as my invention—

The curved piece I or its equivalent, in combination with the discharging-roller K for preventing the accumulation and discharge of the seed under the roller K, when arranged and used substantially as described.

JOHN G. CASE.

Witnesses:
J. M. ALBERTSON,
ELIAS F. MAYALL.